Patented Apr. 14, 1931

1,800,815

UNITED STATES PATENT OFFICE

OSCAR A. CHERRY AND FRANZ KURATH, OF CHICAGO, ILLINOIS, ASSIGNORS TO ECONOMY FUSE & MANUFACTURING COMPANY, OF CHICAGO, ILLINOIS, A CORPORATION OF NEW YORK

COMPOSITION OF MATTER AND PROCESS FOR PRODUCING SAME

No Drawing.   Application filed March 30, 1928.  Serial No. 266,114.

This invention relates to a novel composition of matter and to the process of producing same, and more particularly to the composition of matter and process characterized by reacting, in a manner to be hereinafter set forth, aldehydes, organic acids and amines.

It is known that organic acids will react with aromatic amines to form substances which in some cases are amorphous and in other cases crystalline bodies. Some of the crystalline bodies so formed possess properties which render them useful in the arts for various purposes, whereas the amorphous substances referred to or those bodies which are difficultly crystallizable, have received no extended commercial application.

It is further known that aldehydes such as, for instance, formaldehyde or furfural, will react with aromatic amines under favorable conditions to form amorphous or resinous bodies, which resinous bodies or substances have been of only little use commercially.

It has now been found that by reacting with aldehydes on the reaction products of certain carboxylic acids and aromatic primary amines that products possessing considerable utility may be obtained. These products may be amorphous, or resinous, brittle, or may possess considerable tenacity, depending upon the particular combination of aldehyde, acid and amine selected.

The present invention accordingly proceeds upon the principle of reacting aldehydes, acids and amines to form compositions of matter which are new and useful in the art.

The invention contemplates the use of different acids, aldehydes and amines and, accordingly, it will be appreciated that various combinations of these substances may be selected resulting in the production of slightly different products, but it is to be understood that the invention is to be construed broadly enough to include the group of products produced by reacting the substances in a general manner falling within the scope of this invention, it being, of course, understood that the particular examples given herein are merely by way of illustration, and are ones which represent the preferred forms for practicing the invention.

As above stated, the variations which may be made in the process and product are numerous in that different amines may be used to react with a particular selection of acid and aldehyde, or different acids may be used in connection with a particular aldehyde and amine, or different aldehydes may be used to react with a particular acid-amine reaction product. It is also within the contemplation of the present invention to employ instead of pure compounds, a mixture of one or more of the compounds enumerated, such as, for instance, mixtures of different acids, amines or aldehydes in any desirable combination for the purpose of obtaining the particular properties desired in the final product.

It has also been found, as will be hereinafter more particularly pointed out, that some of the products falling within the group contemplated in the present invention, are waxy substances possessing many of the physical properties of natural waxes.

Accordingly, it is one of the objects of the present invention to provide a new composition of matter or group of substances possessing new and useful properties.

It is a further object of this invention to provide a new and useful group of products or compositions of matter, which are reaction products of aldehydes, acids and amines.

It is a further object of this invention to provide a group of products which are in a general way chemically similar in nature, but which possess slightly varying properties according to the combination of aldehydes, acids and amines selected for their production.

It is a further object of this invention to provide a group of products, some of which are waxy substances possessing many of the physical properties of natural waxes.

It is also an object of this invention to provide a group of substances, some of which possess properties rendering them suitable for use as plasticizing agents for potentially reactive phenolic condensation products in hot molding operations.

It is a further object of this invention to provide a group of substances, some of which possess properties suitable for use as plasticizing agents as above set forth, which will possess either the property of a plasticizing agent, or a lubricant for use in hot molding operations, or of a substance for darkening molding phenolic condensation products, or any combination, or all of these properties.

Various other objects of this invention will appear as the description proceeds.

In order that the invention may be more readily understood, various examples will be given herein of the process and product contemplated and inasmuch as a variety of each of the substances of compounds, viz, the aldehydes, acids and amine, is contemplated in practicing the present invention, it is deemed advisable to group these and treat them separately as typical examples.

Irrespective of the particular selection of compounds, it is to be understood that in all cases the aldehyde is reacted with the reaction product of the acid and amine, or, in other words, the acid and amine are reacted initially and the product thereof is subsequently reacted with the aldehyde.

The first group of examples are those in which various aldehydes are used. The first example of the group is as follows: In a flask equipped with a return condenser, 56.8 parts by weight of stearic acid and 18.6 parts by weight of aniline are heated to substantially from 170° to 200° C. for approximately one hour. Water is formed as a result of the reaction between the organic acid and the amine. In order to eliminate the water so formed, it is desirable to so arrange the condenser that the water may escape, but so that any aniline being volatilized will be returned to the flask. At the end of the heating period, and after some cooling, 19 parts by weight of furfural are added and the whole is heated to about 200° C. for approximately one-half hour. At this temperature the product is a thin liquid, which, upon cooling, solidifies to a waxy, dark brown solid at room temperature. The product so formed is a substitute for natural waxes and is found suitable to replace them in many of their applications, and is especially valuable for use in phenolic condensation products, particularly hot molding compositions made from potentially reactive phenolic condensation products.

The product formed in accordance with the above process is found, when used with hot molding compositions as above referred to, to have a three-fold function. The waxy product first serves to lubricate the composition in such a manner as to prevent sticking of the composition to the steel molds in which these compositions are ordinarily molded. This is a decidedly valuable property especially in connection with certain compositions made in part from furfural, which compositions have a tendency to stick to the mold during hot pressing operations. The above product secondly serves to plasticize the phenolic hot molding compositions, causing the materials to flow more readily during the molding operations; and, thirdly, they serve in such compositions to darken to some extent the final product.

A second example which is somewhat similar to that above given, with the exception that the furfural is replaced by formaldehyde, produces a product somewhat similar to that above described, with the exception that it does not affect the color of the products in which it is dissolved or mixed, but generally speaking, it may be used in the same way as the furfural product, it possessing the lubricating and plasticizing properties. This product is produced by replacing the furfural in the above stated example by 15 parts by weight (37½%) commercial formaldehyde solution. On account of the water in the formaldehyde, the heat treating temperature is necessarily less, and about one hour is usually required to effect complete combination of the aldehyde. The product so obtained is similar to the furfural product, but is a trifle more brittle and is light in color.

A condensing agent, as for example a mineral acid, may be employed to accelerate the reaction between the aldehyde and the amine-acid compound. When furfural is the aldehyde employed, the use of an acid catalyst serves to make the resultant composition of a very deep, black color.

The next examples which are to follow are those in which acids other than stearic acid are used with aniline in substantially the same procedure as that given above. The products which result from the employment of the various acids are found to possess slightly varying properties, depending upon the acid selected, and to a lesser extent upon the aldehyde. For example, succinic acid may be employed in the reaction with aniline and furfural and is found to yield a black, viscous mass, possessing no waxy properties. Benzoic acid, aniline and furfural yield a black product, which is quite tough and somewhat plastic at ordinary temperatures.

By reacting a mixture of benzoic and stearic acids in equi-molecular proportions upon a double molecular proportion of aniline, and by reacting the product with furfural, a black, waxy mass is obtained. This product is somewhat tougher and more plastic than a similar product made from stearic acid alone. By reducing the proportions of benzoic acid in the above mixture, the hardness and the wax-like nature of the product is increased. Oleic acid, aniline and furfural yield a black, viscous, oleaginous product. When the product of a mixture of oleic and stearic acids reacted upon aniline is reacted upon with furfural, a black, tough, waxy product is obtained.

A decidedly resinous substance is obtained by reacting 30 parts of rosin or colophony which is largely abietic acid or its anhydride upon 10 parts of aniline for about three hours, and adding 9 parts of furfural to the product and continuing the heat treatment. The reaction of the rosin-aniline substance with formaldehyde is so violent that if formaldehyde is to be reacted with this substance the solution is to be added slowly in small increments. The rosin-amine-aldehyde product so formed is resinous as is rosin, but is less brittle than rosin. It has a decided plasticizing action on reactive phenolic molding compositions, such as are used in hot molding operations. It is found that by replacing about one-half of the rosin in the above reaction by stearic acid and forming a mixed acid-amine-aldehyde product, a substance possessing both resinous and wax-like characteristics may be obtained.

The examples hereinafter given will be illustrative of the results obtained when various amines are employed. It is found in practice that by using a diamine and by using mixtures of acids as well as single acids, a variety of products may be obtained. The products are in general harder at room temperatures than similar compounds made from simple amines. For example, a hard, wax-like product is obtained by reacting upon one gram mol of meta-phenylene-diamine with one gram mol of benzoic acid and one gram mol of stearic acid, and treating the product with two gram mols of furfural. A black, high melting waxlike substance, not quite so tough as that obtainable as above described, may be made from one gram mol of stearic acid, one gram mol of metaphenylene diamine and one gram mol of furfural. A lower melting substance may be made by increasing the proportions of stearic acid in the above example.

Other amines, such as toluidines and naphthylamines may be used. The carboxylic acids of high molecular weights, that is, those acids containing more than 6 carbon atoms are preferred, as acids of lower molecular weight usually produce crystalline derivatives with aniline. Although there is nothing objectionable per se in a crystalline intermediate product, useful products are generally more easily obtainable from acids of higher molecular weight. In fact, some of the very low molecular weight acids, as for example acetic acid, do not react with aniline to form a product which will easily react with aldehydes.

The particular formulas given above are merely illustrative of the invention as showing preferred methods of practicing the invention but it is to be understood that instead of using pure aldehydes, mixtures of aldehydes may be used with varying technical results, all of which are to be considered within the scope and teaching of the present invention.

We claim:

1. A composition of matter formed by reacting furfural with the reaction product of stearic acid and aniline.

2. A composition of matter formed by reacting approximately 19 parts by weight of furfural with the reaction product of approximately 56.8 parts by weight of stearic acid and approximately 18.6 parts by weight of aniline.

3. The process which consists in heating approximately 56.8 parts by weight of stearic acid and approximately 18.6 parts by weight of aniline to from 170° to 200° C., under a return condenser for approximately one hour, eliminating the water formed, cooling, adding approximately 19 parts by weight of furfural and heating to approximately 200° C. for approximately one-half hour.

4. A composition of matter formed by reacting furfural on the reaction product of stearic acid and aromatic amines.

5. A composition of matter formed by reacting furfural on the reaction product of a carboxylic acid having more than six carbon atoms and aromatic amines.

6. The process which consists in reacting two or more carboxylic acids having more than six carbon atoms with an aromatic amine and then reacting the reaction product thereof with an aldehyde.

7. The process which consists in reacting a carboxylic acid having more than six carbon atoms with two or more aromatic amines and then reacting the reaction product thereof with an aldehyde.

8. A composition of matter formed by reacting furfural and formaldehyde on the reaction product of a carboxylic acid having more than six carbon atoms and aromatic amines.

9. The process which comprises reacting furfural on the reaction product of a carboxylic acid having more than six carbon atoms and aromatic amines.

10. The process which comprises reacting a carboxylic acid having more than six carbon atoms and aromatic amines and then reacting the reaction product thereof with furfural.

11. The process which comprises reacting a carboxylic acid having more than six carbon atoms and aromatic amines and then reacting the reaction product thereof with furfural and formaldehyde.

12. A composition of matter formed by reacting an aldehyde on the reaction product of two or more carboxylic acids having more than six carbon atoms and an aromatic amine.

13. A composition of matter formed by reacting an aldehyde on the reaction product of a carboxylic acid having more than six carbon atoms and two or more aromatic amines.

14. A composition of matter formed by reacting formaldehyde on the reaction product of stearic acid and aromatic amines.

15. A composition of matter formed by reacting formaldehyde on the reaction product of stearic acid and aniline.

Signed at Chicago, Illinois, this 27th day of March, 1928.

OSCAR A. CHERRY.
FRANZ KURATH.